US008221127B1

(12) United States Patent
Poulsen

(10) Patent No.: US 8,221,127 B1
(45) Date of Patent: *Jul. 17, 2012

(54) SUBLIMINAL OR NEAR-SUBLIMINAL CONDITIONING USING DIFFUSE VISUAL STIMULI

(76) Inventor: Peter D. Poulsen, Grants Pass, OR (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/688,864

(22) Filed: Jan. 16, 2010

(51) Int. Cl.
*G09B 19/00* (2006.01)

(52) U.S. Cl. ........................................................ 434/236

(58) Field of Classification Search ............... 434/156, 434/167, 178, 236, 307 R, 308, 309, 314, 434/157; 348/563, 564
See application file for complete search history.

(56) References Cited

U.S. PATENT DOCUMENTS

| | | |
|---|---|---|
| 3,060,795 A | 10/1962 | Corrigan et al. |
| 3,278,676 A | 10/1966 | Becker |
| 4,692,118 A | 9/1987 | Mould |
| 4,717,343 A | 1/1988 | Densky |
| 4,734,037 A | 3/1988 | McClure |
| 5,083,924 A | 1/1992 | Cochran et al. |
| 5,221,962 A | 6/1993 | Backus et al. |
| 5,304,112 A | 4/1994 | Mrklas et al. |
| 5,388,994 A | 2/1995 | Wexelman |
| 5,722,418 A | 3/1998 | Bro |
| 6,057,846 A | 5/2000 | Sever |
| 6,652,283 B1 | 11/2003 | Van Schaak et al. |
| 6,656,137 B1 | 12/2003 | Tyldsley et al. |
| 6,967,594 B2 | 11/2005 | Gerrity |
| 7,011,526 B2 | 3/2006 | Boon |
| 7,648,366 B1 | 1/2010 | Poulsen |
| 2003/0036042 A1 | 2/2003 | Hill |
| 2003/0157468 A1 | 8/2003 | Kasahara |
| 2004/0161730 A1 | 8/2004 | Urman |

OTHER PUBLICATIONS

Watanabe et al; "Greater plasticity in power-level than higher-level visual motion processing in a passive perceptual learning task"; Nature Neuroscience vol. 5 p. 1002 (2002).
Seitz and Watanabe; "Is subliminal learning really passive?"; Nature vol. 422 p. 36 (2003).
Kim et al.; "Effect of reward on perceptual learning"; Vision Society Meeting proceedings May 11, 2007; Journal of Vision vol. 7 No. 9 p. 85a (2007).
Nishina et al.; "Subliminal visual feature is learned better when spatially closer to attended task"; Vision Society Meeting proceedings May 11, 2007; Journal of Vision vol. 7 No. 9 p. 44a (2007).
Tsushima et al; "Greater disruption due to failure of inhibitory control on an ambiguous distractor"; Science vol. 314 p. 1786 (2006).

(Continued)

*Primary Examiner* — Kurt Fernstrom
(74) *Attorney, Agent, or Firm* — David S. Alavi

(57) ABSTRACT

A method comprises: repeatedly presenting to a subject a training stimulus; presenting to the subject a diffuse, non-imaged visual stimulus along with the training stimulus; and presenting the diffuse, non-imaged visual stimulus to the subject without the training stimulus. The training stimulus elicits from the subject a selected physiological, psychological, emotional, or mechanical response. The diffuse, non-imaged visual stimulus is presented without the training stimulus so as to elicit the selected response. The diffuse, non-imaged visual stimulus is presented via a visual display and comprises a selected spatial pattern or arrangement of deviation of a selected parameter of the visual display from a reference level of that parameter. The diffuse, non-imaged visual stimulus is arranged so as to be perceived by the subject only at a subliminal or near-subliminal level. A video display and electronic processor can be arranged to present the training stimulus and the diffuse, non-imaged visual stimulus.

25 Claims, 5 Drawing Sheets

OTHER PUBLICATIONS

Watanabe: "What gates visual plasticity?"; talk given Jan. 19, 2007 at Center for Mind and Brain, UC Davis.

Watanabe et al; "Perceptual learning without perception"; Nature vol. 413 p. 844 (2001).

Seitz et al; "Task-specific disruption of perceptual learning"; Proceedings of the National Academy of Sciences vol. 102 p. 14895 (2005).

Seitz et al; "Visual experience can substantially alter critical flicker fusion thresholds"; Human Psychopharmacology vol. 20 p. 55 (2005).

Co-owned U.S. Appl. No. 11/030,458, filed Jan. 5, 2005 (now Pat No. 7,648,366).

Office Action dated Dec. 13, 2007 in co-owned U.S. Appl. No. 11/030,458 (now Pat No. 7,648,366).

Office Action dated Jul. 8, 2008 in co-owned U.S. Appl. No. 11/030,458 (now Pat No. 7,648,366).

Office Action dated Oct. 30, 2008 in co-owned U.S. Appl. No. 11/030,458 (now Pat No. 7,648,366).

Office Action dated Aug. 5, 2009 in co-owned U.S. Appl. No. 11/030,458 (now Pat No. 7,648,366).

Notice of Allowance dated Sep. 21, 2009 in co-owned U.S. Appl. No. 11/030,458 (now Pat No. 7,648,366).

Co-owned U.S. Appl. No. 12/626,923, filed Nov. 29, 2009.

Preliminary amendment submitted Nov. 29, 2009 in co-owned U.S. Appl. No. 12/626,923.

SUBLIMINAL OR NEAR-SUBLIMINAL CONDITIONING USING DIFFUSE VISUAL STIMULI

This application is related to subject matter disclosed in U.S. non-provisional application Ser. No. 12/626,923 filed Nov. 29, 2009, U.S. non-provisional application Ser. No. 11/030,458 filed Jan. 5, 2005 (now U.S. Pat. No. 7,648,366), and U.S. provisional App. No. 60/534,231 filed Jan. 5, 2004, all filed in the name of Peter D. Poulsen, each of said applications being hereby incorporated by reference as if fully set forth herein.

BACKGROUND

The field of the present invention relates to behavioral conditioning. In particular, methods for subliminal and near-subliminal conditioning, and for eliciting responses so conditioned, are disclosed herein.

The human nervous system processes external source data at very high rates, perhaps as much as several billions of bits per second (several Gbit/sec). A majority of such processing occurs at a subconscious level, but may nevertheless guide the body in its maintenance and control functions. The associated neurological data processing "subsystems" typically call for the attention of the human conscious "executive system" only as needed, such as when something is awry or when the conscious executive has requested a special report. One may appreciate the advantage of such sub-conscious processing in light of the observation that the highest rates of conscious information processing have been estimated to be less than 100 bits per second, even as low as 25 bits per second.

The visual subsystem operates like other human processor subsystems in that (i) it employs subconscious processing, and (ii) much of what is done in response to the images processed by the visual subsystem is not "conscious" activity (e.g., avoiding walking into walls, moving out of the way of approaching objects, and so forth). The evident capacity of the visual subsystem to accommodate high-speed processes and translate them into performance instructions without burdening the executive consciousness is remarkable, and is exploited in the exemplary embodiments disclosed or claimed herein.

It has been estimated that the human visual subsystem processes information at rates that may reach many hundreds of millions of bits per second (i.e., 100 s of Mbit/sec). A majority of this visual processing must necessarily occur at retinal or subconscious levels. It has been estimated that on the order of 100:1 processing compression and certain forms of motion detection occur even before the visual data is passed through the optic nerves. Of this compressed data, only a small subset of the original retinal-image information is used to achieve significant conscious or unconscious results. Focus control, gain control, pupil control, and other visual task functions proceed reliably and smoothly without "executive" conscious intervention.

Visual observables are prioritized and dealt with in a hierarchal fashion. For example, when eyeglasses have a speck of dust or a smudge on them, the effects they produce on such detailed eye functions as reading text are overlooked and bypassed. This does not necessarily mean that the visual subsystem has not taken note of them; it simply means that they have been relegated to a classification where they do not deter consciously mandated focused-image objectives.

One reason that dust and smudges, up to a point, do not impair functions such as reading and driving a car, is that the location of the plane of the eyeglasses is too close to the cornea for the dust and smudges to be focused onto the retina. They typically appear only as blurs and shadows. These blurs and shadows may be noted, but a reader or driver does not respond to them in the same manner as he responds to printed letters and road features that are focused onto the retina.

It has long been the practice of information and display technologists to assume that essentially all optically-based information presented to the eye should be focused to a sharp, well-defined image. This is the case, for example, with written and graphic presentations in virtually all visual display systems, such as movies, television, computer displays, printed displays, and the like. It has also been a tenet of prior practice to assume that eyeglasses, eyewear, windows, or similar substantially transparent devices should be clear and unchanging (exceptions being photochromic media used in light-adaptive eyewear or welding masks). Such prior limitations are disregarded in the embodiments disclosed or claimed herein. The scope of the present disclosure encompasses use of diffuse, non-imaged visual stimuli (e.g., a purposely out-of-focus image, or an otherwise diffuse, non-imaged visual light pattern) impinging on the human (or animal) retina to impart information that may influence a human (or animal) subject in a subliminal, or near-subliminal, manner.

It is reasonable to posit that all subliminal processing is experience based. That may be why previous attempts at subliminal inducements, such as interspersing frames of cola images in movies, have failed. The frames are not "seen" due to integration, nor do they provide a relevant experience. In contrast to these failed historical endeavors, the embodiments disclosed or claimed herein provide a relevant associated experience with each subliminal training event.

SUMMARY

A method comprises: (i) repeatedly presenting to a subject a training stimulus; (ii) presenting to the subject a diffuse, non-imaged visual stimulus along with each presentation of the training stimulus; and (iii) presenting the diffuse, non-imaged visual stimulus to the subject without the training stimulus. The training stimulus elicits from the subject a selected physiological, psychological, emotional, or mechanical response. The diffuse, non-imaged visual stimulus is presented to the subject without the training stimulus so as to elicit from the subject the selected response. The diffuse, non-imaged visual stimulus is presented via a visual display and comprises a selected spatial pattern or arrangement of deviation of a selected parameter of the visual display from a reference level of that selected parameter. The diffuse, non-imaged visual stimulus is arranged so as to be perceived by the subject only at a subliminal or near-subliminal level.

A system comprises a visual display and an electronic processor operatively coupled to the visual display. The processor is structured and connected to transmit to the visual display one or more electronic signals to cause presentation via the visual display to a subject of (i) the diffuse, non-imaged visual stimulus represented by the first electronic signal and (ii) the training stimulus or a selected visual stimulus represented by the second electronic signal.

Objects and advantages pertaining to methods and apparatus disclosed or claimed herein may become apparent upon referring to the exemplary embodiments illustrated in the drawings and disclosed in the following written description or claims.

The embodiments shown in the Figures are exemplary, and should not be construed as limiting the scope of the present disclosure and/or appended claims.

DETAILED DESCRIPTION OF EMBODIMENTS

Methods are disclosed or claimed herein for training a subject so that a diffuse, non-imaged visual stimulus (i.e., a subliminal or near-subliminal stimulus) elicits a desired response from the trained subject. Additional methods are disclosed herein for eliciting the conditioned response by presenting the diffuse, non-imaged visual stimulus to the subject after the subject has been trained. The diffuse, non-imaged visual stimulus typically comprises a non-imaged visual arrangement or visual pattern, i.e., a visual arrangement or pattern that, if perceived at a supraliminal level, does not result in recognition by an observer of content such as an image, text, symbol, or object (e.g., because the arrangement or pattern includes no such content or because the arrangement or pattern is sufficiently diffuse, defocused, or "smeared" to render such content unrecognizable). The disclosed embodiments are processes to train, and utilize the training, of a subject by presentation during training of a repeated subliminal or near-subliminal sensory stimulus (i.e., a diffuse, non-imaged visual stimulus) along with a training stimulus (e.g., an emotional experience, or a conscious instruction/response set, or other training stimulus). After sufficiently many repetitions of the training stimulus along with the diffuse, non-imaged visual stimulus, the trained subject will tend to exhibit the desired response in response to the diffuse, non-imaged visual stimulus presented alone or in combination with a different accompanying stimulus, without the training stimulus. The methods disclosed herein may be better understood nominally dividing stimuli (or cues) into two categories: (i) discernable, or conscious; and (ii) subliminal, near-subliminal, subconscious, near-subconscious, diffuse, or non-imaged, and by nominally dividing the methods into two categories: (i) training or conditioning; and (ii) utilization.

Figure 1:
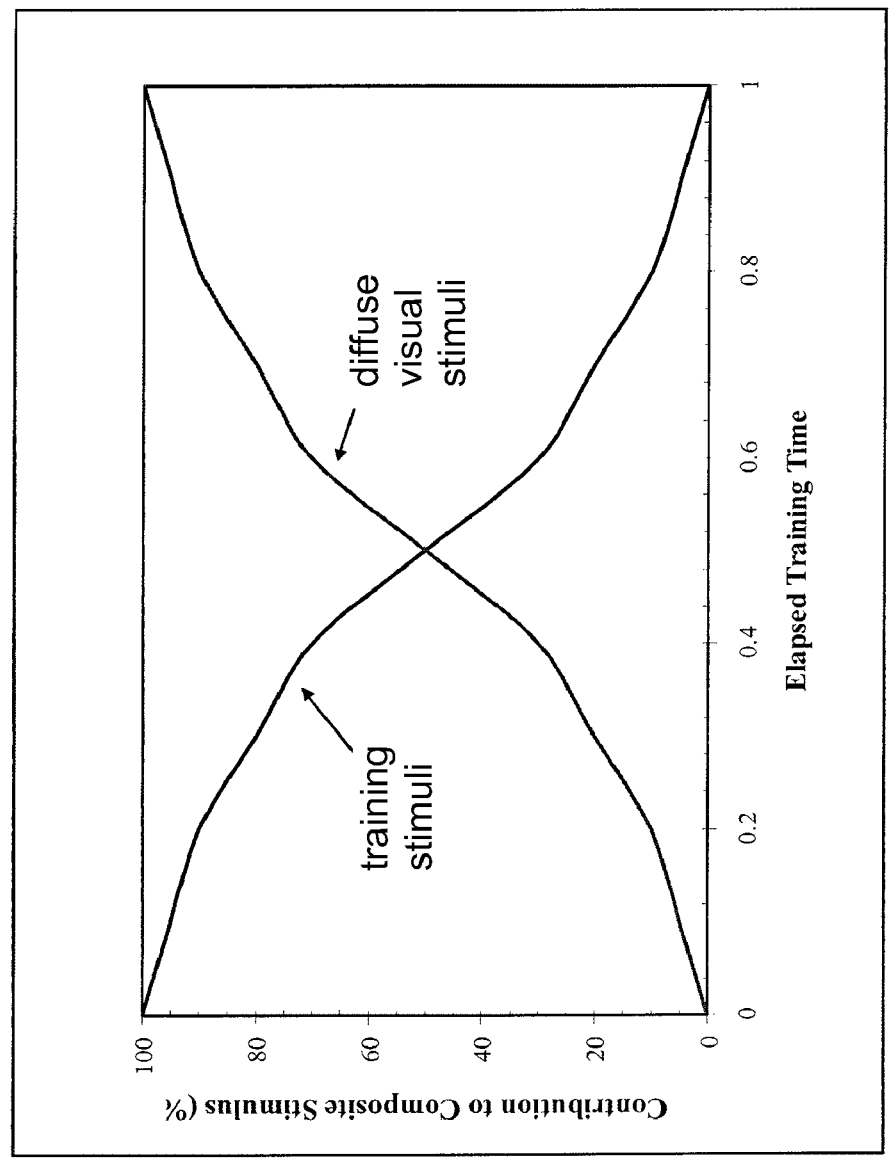
FIG. 1 illustrates schematically one exemplary scheme for varying the presentation of training stimuli and diffuse, non-imaged visual stimuli.

During a training or conditioning process, a subject is presented with an integrated, composite set of stimuli, one or more of which that are discernable to conscious awareness (the training stimulus), and one or more of which that are subliminal to conscious awareness (e.g., a diffuse, non-imaged visual stimulus). Although in some exemplary training processes or methods a subject may recognize that he or she is being trained to give a specific desired response to a specific discernable cueing stimulus (the training stimulus), the subject may not realize that he or she is also being trained to exhibit the same response due to a subliminal component of the composite cue (i.e., due to the diffuse, non-imaged visual stimulus). The discernable cues or training stimuli may be reduced in strength during training so that the subject becomes relatively more strongly influenced by the subliminal or near-subliminal component of the composite stimuli (illustrated schematically in FIG. 1). In some embodiments, an objective of the training or conditioning may be to render more significant the influence of the subliminal stimulus than the influence of the training stimulus, so that the trained or conditioned subject operates as if the discernable component or training stimulus were still present.

It is not always necessary that the subject take strong note of the presence of a discernable stimulus (i.e., the training stimulus) as an element of the training process. It may be the case that other consciously observable stimuli capture a subject's attention with a higher priority than the training stimulus at a given moment. In other cases, however, it may be necessary for the subject to be aware of the discernable stimulus at a high-priority conscious level. This would be the case, for example, if as the discernable component (training stimulus) of the composite stimulus a subject were being audibly instructed via spoken language, or visually instructed via text or graphics, to perform a certain action. For example, the training stimulus might comprise the instruction "Flip the red switch," while the corresponding desired response would be the subject flipping the red switch. Such a training stimulus would fall within the conscious awareness of the subject. In this example, the intended outcome of the training would be the subject flipping the red switch in response to the diffuse, non-imaged visual stimulus, without the accompanying "Flip the red switch" instruction.

In other embodiments, it may be neither necessary, nor desirable, for the subject to be intellectually aware of, or focused on, either the discernable stimulus cue or the discernable response during the training process. An example of such an embodiment might comprise the use of commercial entertainment movies for training. When a subject is presented with a movie that contains scenes that evoke strong emotional response (fear, anger, joy, etc.), a subject may typically discern that he or she is undergoing such a response, and the subject may typically discern that he or she is undergoing the emotional response in a direct relationship to the discernable stimulus (i.e., the movie scene, or the evocation of memory or anticipation of the content in another scene). However, the conscious mind of the subject might typically be too preoccupied with the flow of the movie to devote efforts toward organizing an immediate analytical interpretation of cause and effect for the emotional response. It need not be the case that a training stimulus be specifically caused for purposes of training. For example, everyday occurrences or life experiences (not contrived for training purposes) can serve as a source of training stimuli. A diffuse, non-imaged visual stimulus can be presented to a subject at each occurrence of a certain event or action (e.g., hearing a doorbell ring in the normal course of daily activities) to train the subject to perform a corresponding desired action (e.g., opening the front door) when the diffuse, non-imaged visual stimulus is later presented without the corresponding "training" stimulus. Reduced conscious attention in no manner diminishes the reality of either the stimulus or the response, or the subject's ability to discern them. The training of emotionally conditioned response to subliminal or near-subliminal stimulus facilitates the later utilization of the disclosed systems and methods for the evocation of an emotional response even under circumstances that such an emotion might not be generally considered appropriate.

Any desired response on the part of the subject may fall within the scope of the present disclosure, and may include, but are not limited to: (i) mechanical actions, i.e., a volitional or non-volitional movement on the part of the subject; (ii)

physiological manifestations; or (iii) psychological or emotional responses. These will be briefly discussed at this juncture for the purpose of differentiation and clarification. The examples presented should not be construed as limiting the scope of the disclosure or appended claims. It should be noted that the conditioned responses typically differ from intuitive responses or from instinctual responses.

Examples of mechanical actions would include, but are not limited to, volitional or non-volitional movement of body parts (arms, hands, fingers, legs, feet, toes, torso, neck, head, etc.). Such movement might be used to throw a switch, hit a brake, strike an object, say a word or phrase, or any other desired movement. Mechanical actions are bodily responses, including speech, often imposed on objects or elements external to the subject. An observer might classify such responses as a subject's overt behavior.

Examples of physiological manifestations might include, but are not limited to, altered pulse rate, altered respiration rate, altered blood pressure, nausea, sweating, urinary urgency, irritable bowels, shivering or trembling, sexual arousal, or other bodily responses that do not necessarily impose themselves mechanically on elements external to a subject. Physiological manifestations (which might include chemical, muscle, tissue, and other bodily elements) might be predominantly internal to a subject.

Examples of psychological or emotional responses might include, but are not necessarily limited to, anxiety, anger, joy, fear, contentment, mirth, and the like. These may or may not be expressed in immediate terms as associated mechanical or physiological responses.

in some exemplary embodiments, the training stimulus can comprise, e.g., a selected image, video sequence, graphic element, text, symbol, or scene that is presented to the subject using a visual display with the diffuse, non-imaged visual stimulus superimposed or overlaid on the training stimulus. The visual display can comprise, e.g., a viewing screen, a video display, a still-image display, a heads-up display, a head-mounted display, or eyewear. The diffuse, non-imaged visual stimulus can comprise a selected spatial pattern or arrangement of deviation of a selected parameter of the visual display from a reference level of that selected parameter. Examples of such parameters can include brightness, lightness, hue, chroma, saturation, polarization, image focus or blur, or image noise level. Multiple parameters can be altered simultaneously, if desired. Examples of spatial patterns of deviation of those parameters can include a monotonic variation across the display (horizontally, vertically, or obliquely), spatially periodic variation (with selected amplitude, period, or direction), radial or azimuthal variation (monotonic or oscillatory), temporally oscillatory variation (with selected amplitude or period), or combinations thereof. The reference level of a visual display parameter can be its average level over the entire visual display area, its average level over corresponding localized areas of the visual display, or its specific level at each location of the visual display. Such reference levels are typically based on, determined by, or derived from the visual training stimulus presented via the visual display on which the diffuse, non-imaged visual stimulus is superimposed or overlaid, or on another selected visual stimulus presented via the visual display on which the diffuse, non-imaged visual stimulus is superimposed or overlaid.

In one example of a diffuse, non-imaged visual stimulus, the brightness level of each pixel of a digital image or video sequence can be altered by a number of digital brightness levels that varies linearly across the width of the display. In another example, one color (red, green, or blue) of an image or video sequence can be altered by a number of digital color levels that varies approximately sinusoidally along the height of the display with maxima at the top, middle, and bottom and intervening minima. In another example, the two preceding alterations can be applied simultaneously. In another example, the image noise level of a text and graphic display can vary radially with minimum noise at the center of the display. In another example, an image or video sequence can include a selected spatial pattern of slight blurriness across the image. These are only a few examples among myriad combinations of spatial pattern(s) and visual display parameter(s) that can be manipulated to produce a diffuse, non-imaged visual stimulus.

Emotional Response to a Video Display

In an exemplary embodiment, movies or video programming may be employed as the training medium, wherein a specific subliminal or near-subliminal cue is presented each time a corresponding specific emotion is engendered by a scene of a movie. Viewing of movies by the public affords the opportunity for hundreds or even thousands of hours of training time for individual members of the public. Video displays for entertainment and for commerce are widely used and are of substantially similar format, and afford numerous opportunities for training many subjects to exhibit desired trained responses.

Figure 2:
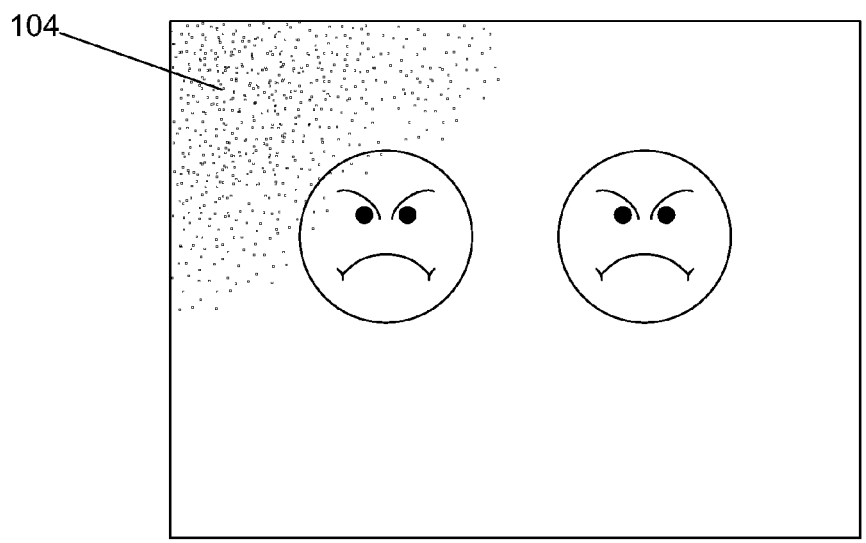
FIG. 2 illustrates schematically an exemplary diffuse, non-imaged visual pattern overlaid on an image eliciting a negative emotional response.
Figure 3:
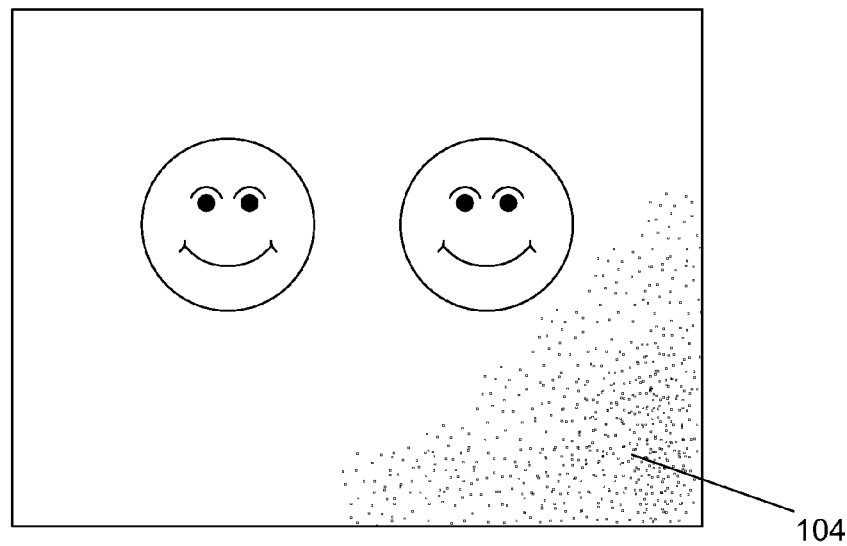
FIG. 3 illustrates schematically an exemplary diffuse, non-imaged visual pattern overlaid on an image eliciting a positive emotional response.

For example, movies might be "spiked" with subliminal or near-subliminal diffuse, non-imaged visual changes that coincide with emotional events in the movie. A first diffuse, non-imaged visual stimulus in the form of, e.g., a slight change of brightness 104 in the upper left corner of the picture 102 can be presented every time a negative emotion is induced by the visual and audio content of the movie (as in FIG. 2), with the visual and audio content of the corresponding temporal segment of the movie acting as a training stimulus. The change in brightness can be imposed in a diffuse form, feathered into the main picture toward the center so that no notable edge is present (as schematically illustrated in FIGS. 2 and 3), thereby keeping it at a subliminal or near subliminal level. A second, similar subliminal or near-subliminal diffuse, non-imaged visual effect can be imposed on the opposite corner of the picture (the lower right) and presented only when a positive emotion was induced by the content of the corresponding temporal segment of the movie (as in FIG. 3), with the content of that segment of the movie acting as a different, second training stimulus. Instead of brightness, another parameter of the visual display can be varied as described, such as hue, lightness, chroma, saturation, polarization, image focus or blur, or image noise level. Instead of the simple variation of one corner of the visual display, other, possibly more complex spatial patterns of deviation can be employed (such as the examples described above).

Since an average viewer watches thousands of hours of DVD movies, taped movies, and television broadcast movies every year, widespread, consistent presentation of such diffuse, non-imaged visual effects (for example, the spatial brightness variations of FIGS. 2 and 3), accompanying movie scenes having corresponding emotional content (i.e., acting as training stimuli), would eventually train viewers to feel emotionally negative when the first diffuse, non-imaged visual effect was present and to feel emotionally positive when the other diffuse, non-imaged visual effect was present. One effect of such widespread training might be enhancement of emotions induced by video programming that include the diffuse, non-imaged visual stimuli. A viewer already trained by previous movie viewing to react negatively to one diffuse, non-imaged visual effect and positively to another might react more strongly emotionally to negative or positive scenes in another, subsequently viewed movie. Once a population were conditioned to exhibit these specific emotional reactions (i.e., desired responses) to the corresponding diffuse, non-imaged visual stimuli, those stimuli could be introduced in other contexts to influence subjects' emotional reactions when viewing other displayed video material. The conditioned emotional responses could be employed to influence viewing, purchasing, or voting decisions, for example, by overlaying the corresponding diffuse, non-imaged visual stimulus onto image- or video-based advertising. Even a small degree of effectiveness of such training may result in a major sales or political advantage, since the success of a business or a political campaign often rests on a small margin of difference between the successful choice and the unsuccessful choice.

It should be noted that, to some degree, the music within the movie is used to assist the attainment of a desired psychological or emotional response of a viewer. There are common musical elements used to prelude or to enhance the emotional response associated with a scene or image. However, these preludes and enhancements are all discernable. While they are in the "background," they are easily noted on a conscious level by the subject's hearing. Such would not fall within the scope of subliminal or near-subliminal stimuli as disclosed or claimed herein.

Figure 4:
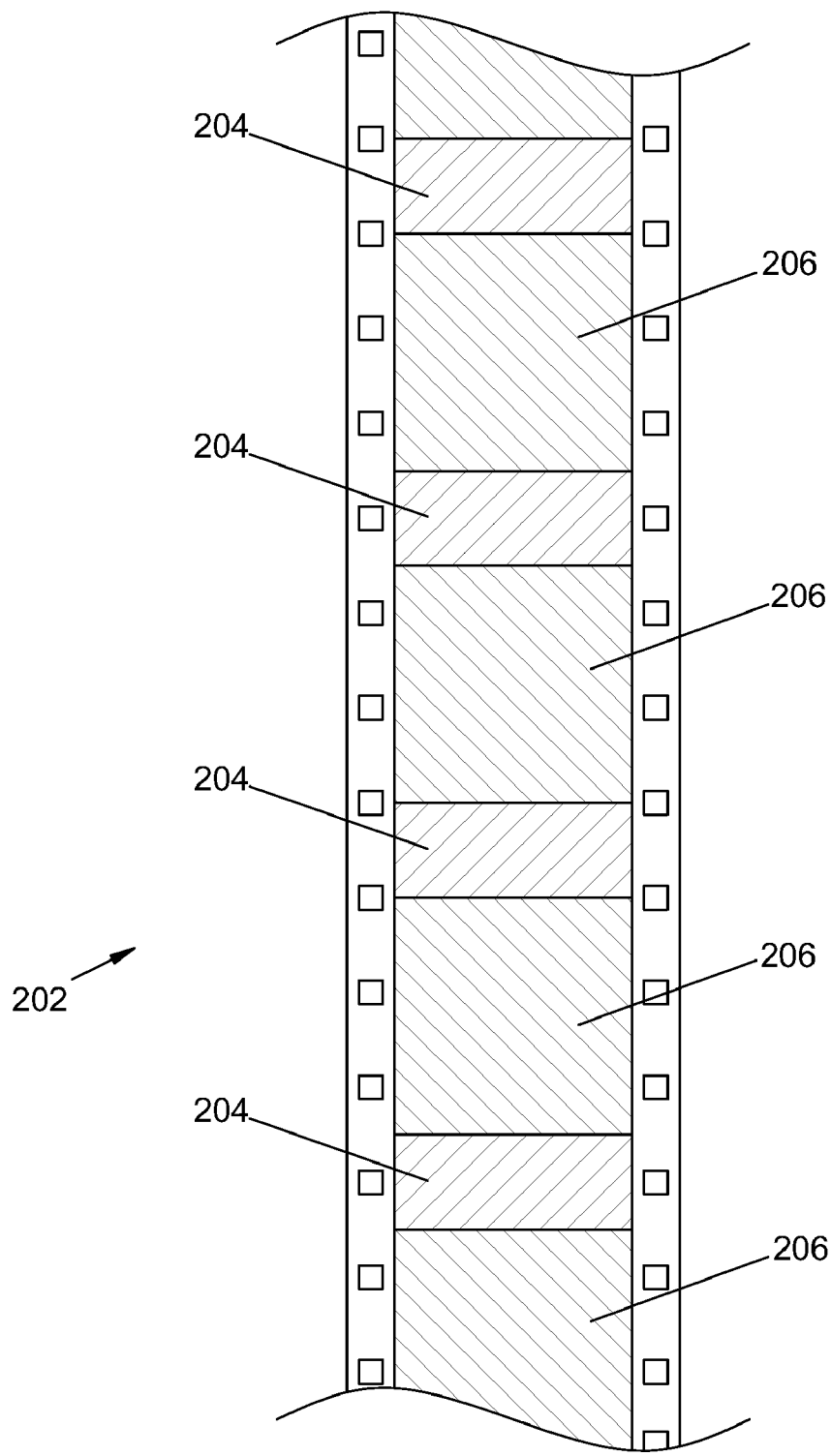
FIG. 4 illustrates schematically one exemplary sequence for inserting training images into a movie or program sequence.

FIG. 4 schematically illustrates a training scene sequence, wherein various training scene sequences may be implemented. In a first example, training scenes or images 204 (i.e., training stimuli), not necessarily related to the movie or program, are inserted into the program or movie sequence 202 between normal scenes or images 206. The inserted scenes or images are chosen to evoke the desired emotional response to be conditioned (i.e., the desired response), and the corresponding diffuse, non-imaged visual effect (the diffuse, non-imaged visual stimulus) is superimposed onto the appropriate portion of the training scene or image. Repeated occurrences of the training scenes along with the diffuse, non-imaged visual effect eventually trains the subject to exhibit the desired emotion in response to the diffuse, non-imaged visual effect alone, without the accompanying training scene or image. In a second example, the training scenes might be normal scenes of the movie or program, with overlaid discernable training images (chosen to evoke the desired emotional response) and overlaid diffuse, non-imaged visual effects (to eventually correspond to the desired emotional response). In a third example, the training scenes might be actual scenes of the movie or program, and the appropriate diffuse, non-imaged visual effect overlaid when the inherent emotional content of the movie or program scene matches the desired emotional response. Whichever of these schemes is used, or if other schemes are devices and used, repeated occurrences of the training scenes along with the corresponding diffuse, non-imaged visual effect eventually trains the subject to exhibit the desired emotion in response to the diffuse, non-imaged visual effect alone, without the accompanying training scene or image. The diffuse, non-imaged visual effects may then be superimposed on other images in order to evoke the desired response from suitable conditioned subjects. Many uses (and potential abuses) of such conditioning in advertising, marketing, politics, and other areas may be devised.

Visual Display System

Any suitable visual display hardware or software can be employed for implementing the methods disclosed or claimed herein. The following are exemplary only and not intended to be limiting.

The training stimulus or other selected visual stimulus can comprise image, video sequence, graphic element, text, symbol, or scene presented via the visual display, and can be provided electronically in digital or analog media or as "hard" media (e.g., film or print). In any of those examples, the diffuse, non-imaged visual stimulus can be incorporated directly into the training or selected stimulus. For example, film or print media can be altered to incorporate the diffuse, non-imaged visual stimulus directly in the film or print. If stored electronically, data representing the stored training or selected stimulus can be altered to also exhibit the diffuse, non-imaged visual stimulus. In that event, an electronic signal derived from the electronic storage medium, used to cause a visual display to present the training or selected stimulus with the superimposed diffuse, non-image visual stimulus, would typically comprise a single, composite electronic signal representative of both presented stimuli.

In other examples, the training or selected visual stimulus is distinct from the diffuse, visual stimulus. For example, if the training or selected visual stimulus is provided in a hard medium, the diffuse, non-imaged visual stimulus can be superimposed via lighting projected onto the training or selected visual stimulus, or by manipulation or modulation of a transparent medium through which the training or selected visual stimulus is observed by the subject. If the training or selected stimulus is projected onto a screen (from film or slides, digital or analog), the diffuse, non-imaged visual stimulus can be separately projected onto the same screen, or can be superimposed by manipulation or modulation of a transparent medium through which the training or selected visual stimulus is projected onto the screen. If presented via an electronic display, separate signals can be generated representing, respectively, the training or selected visual stimulus and the diffuse, non-imaged visual stimulus. Those separate signals can be combined before transmission to the visual display, or can be transmitted separately to the visual display, in either case causing the visual display to present the training or selected visual stimulus with the superimposed or overlaid diffuse, non-imaged visual stimulus. The electronic signals can be generated and presented locally (e.g., using a video playback device attached to a television), or can be generated or presented remotely (e.g., broadcast, cable, satellite, or Internet-based video signals received by a computer or a television set-top box or antenna). It should be noted that the entity "presenting" the training stimulus, selected visual stimulus, or diffuse, non-imaged visual stimulus can be an entity that (i) acts directly to create that stimulus in a visible form (e.g., by projecting the stimulus onto a screen or presenting the stimulus on a video monitor), (ii) broadcasts or transmits a signal encoding the stimulus, or (iii) creates or distributes a recorded medium encoding the stimulus.

In a suitable system, electronic signals representing the training stimulus, selected visual stimulus, or diffuse, non-imaged visual stimulus, separately or combined, can be generated from data stored, in analog or digital form, on any suitable storage medium, including but not limited to: magnetic tapes or discs of any suitable type or format; optical discs of any suitable format (e.g., CD, DVD, DVD-HHD, Blu-ray, or other); solid-state storage of any suitable format (e.g., ROM, RAM, flash memory, or other); or other suitable storage media. Any suitable corresponding reading or playback device can be employed, including but not limited to: video tape players; video disc players; computer or game consoles; other suitable playback devices. In any suitable system, any type of analog or digital display can be employed, including but not limited to: CRT displays; flat panel displays (LCD, plasma, LED, OLED, or other); projection displays or screens, including home or commercial theater screens; televisions; computers; so-called "smart phones" or other handheld or portable devices; or other suitable displays.

Aid for the Hearing Impaired

Among the significant communication problems that burden persons with severe hearing impairment are: inaccurate lip-reading; unclear speech (typically due to lack of auditory feedback, particular for congenital or early-onset deafness); unawareness of a speaker out of view; and unawareness of audio cues, signals, alarms, and so forth. These problems may be addressed through implementation of methods disclosed or claimed herein, for example by using a liquid crystal technology, near-field optics, and the abundant capacity of the human visual subsystem to convey sound into the subconscious mind for routine subliminal or near-subliminal processing.

Like the visual subsystem, the human auditory subsystem is also predominantly subconscious in its processing and in its evocation of body responses. Time-varying sound pressure is converted into amplitude/frequency/time information through the sophisticated yet relatively straightforward mechanical principles of cochlear transduction. The conversion and processing rate of the sound pressure signal, which has been estimated to have usable content input to the ear of about 40-thousand bits per second, is compressed and sent to the brain for further processing at on the order of 10-thousand bits per second (estimated). When mechanical components, or cochlear function, or a portion of the ear-to-brain nerve network, or a combination of these, are impaired, then a person exhibits hearing deficiency. Such deficiency may produce complete deafness. The excess capacity of the visual subsystem may be called upon to take on additional burdens to assist a hearing-deficient person in the everyday conduct of life. Observed examples demonstrating the possibility of such adaptations include synesthesia and compensatory hearing enhancement in a blind person (including encroachment of audio synaptic activity into brain areas normally active in a sighted person during visual perception).

Figure 5:
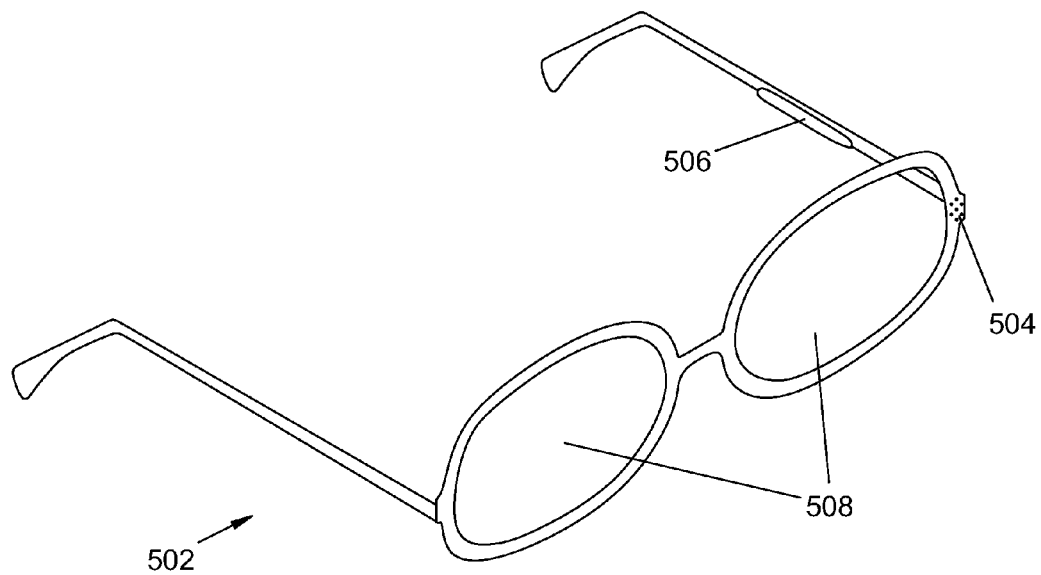
FIG. 5 illustrates schematically exemplary eyewear.
Figure 6:
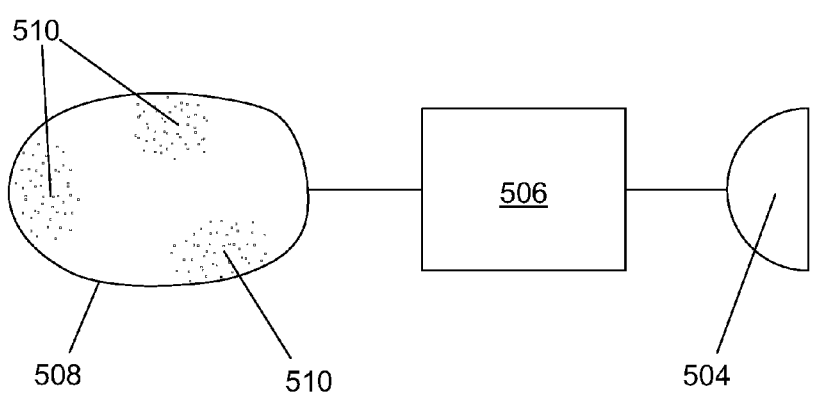
FIG. 6 illustrates schematically a microphone, processor, and eyewear.

In this exemplary embodiment (schematically illustrated in FIGS. 5 and 6), the actual auditory input may be received by a microphone 504 or other transducer and converted to a diffuse, non-imaged visual pattern 510 by an electronic processor 506 according to a predetermined algorithm (e.g., frequency bins or phonemes). The diffuse, non-imaged visual pattern may be presented to the visual subsystem of the hearing-deficient subject in a non-obtrusive way. Through repeated use and practice (i.e., conditioning or training), the hearing-impaired subject's visual subsystem learns to interpret the diffuse, non-imaged visual patterns, and these interpretations may enhance the accuracy of lip-reading, may enable the subject to become aware of and even correctly interpret sounds emanating from outside his or her field of view. Such feedback may also provide feedback to the subject so as to improve his or her own speech, since his/her own speech sounds may be monitored and compared with those of other people with whom he/she converses.

In an exemplary embodiment, liquid crystal strips and microelectronics might be used to create "dynamic smudges" on lenses 508 of eyewear 502 adapted therefor to introduce diffuse, non-imaged visual patterns 510 into the subject's visual processing subsystem. Any other suitable means may be employed as well. These diffuse, non-imaged visual inputs may assist a hearing-deficient subject to improve his/her lip-reading accuracy, or to improve his/her speech clarity. The eyeglasses 502 need not be bulky or unattractive, since the embedded liquid crystal strips are themselves transparent when not activated and in general may be effective when only activated to levels of ten percent or less of the glasses transparency. Other levels of transparency modulation may be employed within the scope of the present disclosure or appended claims. The microphone 504 or other transducer and the electronic processor 506 may be made sufficiently small to be embedded into the ear-stem of the glasses, although other sizes or locations of the microphone or other transducer and the electronic processor shall also fall within the scope of the present disclosure or appended claims. Alternatively, this exemplary embodiment may employ discrete emitters, rather than liquid crystal transmission smudges, with the location of the emitters being at a position too close to the eye to be focused on the retina and thereby yielding a diffuse, non-imaged visual pattern. The diffuse, non-imaged nature of the visual patterns are such that they are subliminal or near-subliminal, and therefore do not distract from conscious visual attention.

As an example, the device might introduce visual smudge changes at about 3200 bits per second, an amplitude-frequency-time information domain similar to that characterizing a normal data rate between the ear and brain. This additional 3200 bits per second is well within the capabilities of the visual subsystem channel capacity or its processing capability. Operating at a sub-conscious level, this dynamic smudge information will be "learned" by the wearer of special eyeglasses when used consistently and may improve lip reading accuracy as well as mouth, tongue, and vocal chord control while speaking.

Any suitable algorithm for converting auditory inputs into diffuse, non-imaged visual patterns may be employed. One example of such an algorithm might be analogous to a spectrum analyzer, and might produce "smudges" resembling a display of a graphic equalizer. Another example of a suitable algorithm might produce smudges diffusely related to an oscilloscope trace (e.g., a "smeared out" or defocused trace that would not be recognized as such if perceived at a supraliminal level). Other algorithms can be contrived and implemented as well. As the subject wears the eyewear, the learning is experiential rather than tutorial; it is the result of common, everyday, repeated activity. A hearing person need not be formally taught the sound of a closing door, a telephone ring, a doorbell, a siren, or a multitude of other sounds. Experience is the informal teacher of them all. Likewise, a hearing-deficient subject wearing the specially-adapted eyewear is not formally taught the particular patterns of "smudges" corresponding to the closing door, telephone ring, doorbell, siren, and so forth. But repeated exposure to those sounds (the training stimuli) along with the corresponding smudges (the diffuse, non-imaged visual stimuli) eventually associates the diffuse, non-imaged visual patterns with the desired response (answer the phone, open the door, avoid the fire truck, and so on). Similarly, repeated lip-reading (the training stimulus) while wearing the special eyewear (providing the diffuse, non-imaged visual stimulus) eventually may lead to the desired response (accurate lip-reading, or awareness of a speaker when out of view). A hearing-deficient subject wearing the specially-adapted eyewear disclosed herein can, in the experience of everyday activity, subliminally or near-subliminally learn to associate the diffuse, non-imaged visual patterns with corresponding sounds, even if his or her own ears do not record the sounds.

For clarification, note that the 3200 bit per second visual input does not mean that the "smudges" in glasses that use this system are modulated at 3200 cycles per second. This rate would be many times faster than the visual fusion rate of the eye. The 3200 bit per second information rate is a result of 32 smudge areas on the glasses being modulated at only ten times per second (well below the fusion rate), with an amplitude resolution of ten levels possible for each area. Other overall rates may be employed, and an overall rate may be achieved through any suitable combination of numbers of smudge areas, modulation rate (below the visual fusion rate), and amplitude resolution while remaining within the scope of the present disclosure or appended claims.

Status or Tactical Indicators

Aircraft pilots of today are already presented, and soldiers of the future are likely to be presented, with image information in the traditional focused image display form, presented to the eye with some variation of a helmet-mounted display (HMD) or a heads-up display (HUD). The quantity of this information may be overwhelming to conscious processing, which is of limited bandwidth. Various efforts are already made to reduce the load on conscious processing, such as: automatic prioritization of targets, flashing of colored text and symbols for warning of urgent conditions, and highlighting of imagery to draw attention to computer-assessed areas of concern, along with other efforts to reduce the visual presentation burden placed upon a pilot or soldier using a helmet-mounted display.

Figure 7:
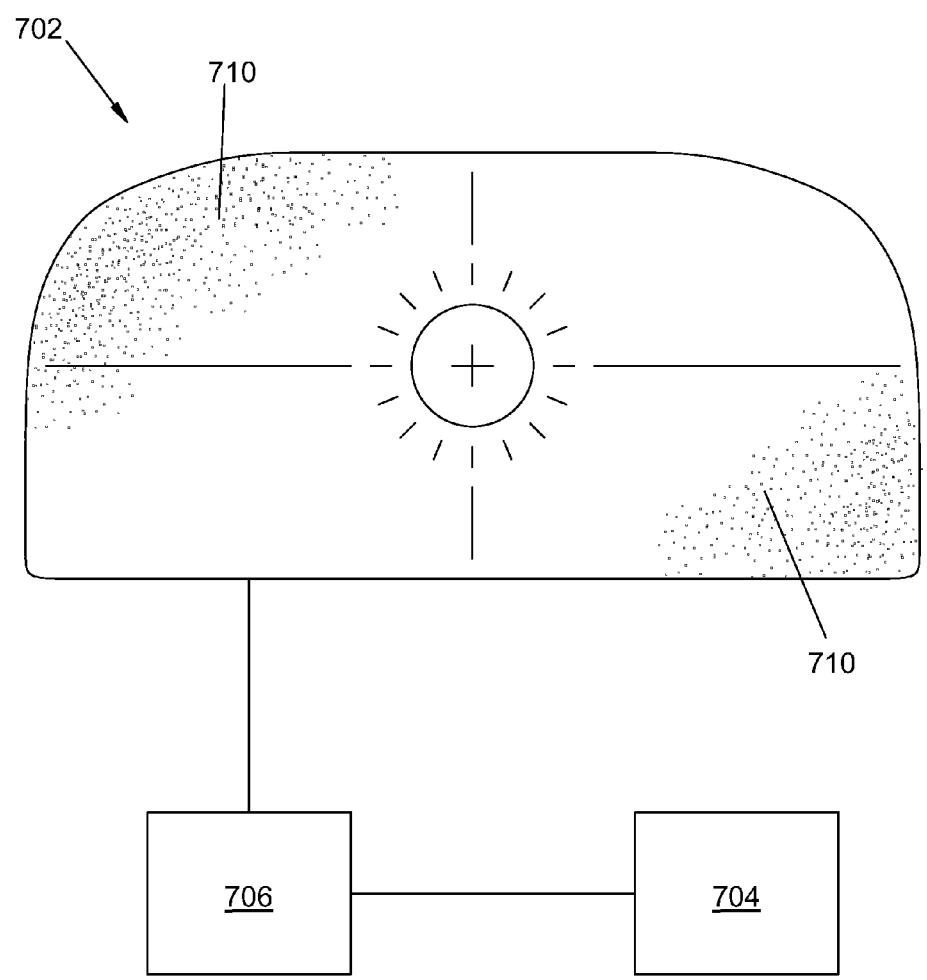
FIG. 7 illustrates schematically a sensor, processor, and display.

By implementations of methods of the present disclosure (schematically illustrated in FIG. 7), a significant amount of the information that might otherwise require conscious processing might be shifted to the high-bandwidth subconscious visual processing system. The HMD or HUD system may be adapted to create the needed diffuse, non-imaged optical effects in any of a variety of suitable ways. These may include, but are not limited to: imparting a diffuse, non-imaged overlay onto the field of the primary display, or interposing a near-field optic with embedding liquid crystal or emitter technology between the pilot's eye and a standard HMD or HUD. In FIG. 7, the view through a display 702 (head-mounted or heads-up) is shown, with a diffuse, non-imaged visual pattern 710 overlaid thereon. The specific diffuse, non-imaged visual pattern is generated by electronic processor 706 based on signals received from status/tactical sensor 704. Other diffuse, non-imaged visual patterns may be produced as the signal from sensor varies, or based on signals from other sensors.

Examples of status or tactical data that might be suitable for subliminal or near-subliminal visual processing might include aircraft status parameters that require continuous monitoring (fuel, altitude, airspeed, stall speed, cabin pressure, and so on), but would interfere with "focused task" endeavors in critical circumstances if presented as focused text or a gauge. Subliminal training may be restricted to key, vital information, thereby reducing the propensity to ignore important cues to such information. This differs substantially from the case of giving alarm or key status information through the auditory system. The auditory system is so saturated with day-to-day experiential training that a human subject may ignore, or purposely turn off, such inputs when engaged in focused tasks such as pursuing targets (target fixation). For example, a pilot may be trained to associate a certain near-subliminal diffuse, non-imaged visual pattern with flipping the switch to access an auxiliary fuel tank. Upon reaching a threshold fuel level, the HMD or HUD may present the diffuse, non-imaged visual pattern, prompting the pilot to flip the auxiliary fuel switch at a subconscious level without interfering with target pursuit. As another example, another diffuse, non-imaged visual pattern might be associated with flipping a switch for an emergency oxygen supply. The subconscious access to the human brain established according to the methods disclosed or claimed herein may enable avoidance of aircraft accidents arising from the loss of oxygen at altitude, events that are such a danger because pilots become oblivious to standard warning signals when oxygen is lost.

Additional Embodiments

Room lights, other ambient lighting, display lights, and other lighting situations may also be slightly modified (at a subliminal or near-subliminal level) to produce conditioned response results according to the methods disclosed or claimed herein. Regardless of the manner in which the training is performed or the diffuse, non-imaged visual stimulus is presented, a suitably trained subject may later be induced to select one option rather than an alternative. For example, a subject might be looking at a display of competitive products. When one competitor's product is picked up, the background lighting could be slightly changed in accord with the subliminal training that was imparted using movies as the training vehicle, or some other display in which experiential coincidence can be repeated. A negative emotional sense could be invoked that induces the subject to put the first product down and pick up a competitor's product. The positive enforcement lighting subtlety could then be introduced, replacing the previous negative lighting subtlety, thereby confirming the subject buyer's feeling about purchasing the second product rather than the first.

Methods disclosed herein may be implemented utilizing other subject sensory regimes, including visual, tactile, taste, smell, and auditory. Visually-based exemplary embodiments are disclosed in detail herein. However, examples may be implemented for other sensory realms as well. For example, in one example of an auditory-based embodiment, existing music recordings are employed, most advantageously music recorded on CD, DVD, and other digital media. Blended into the music as it is played, using suitably modified playback hardware, would be subtle, diffuse subliminal (or near-subliminal) modifications that may not be identifiable as an element of the music. Such diffuse auditory stimuli may include, for example: slight impositions of noise; slight shifts in frequency of playback across the entire audio spectrum; slight shifts of frequency at selected portions of the audio spectrum; overlay of volume changes at low, sub-aural frequency (less than 20 Hz); other suitable modifications. Other suitable audio modifications may be contrived within the scope of the present disclosure. In another auditory-based exemplary embodiment, suitable diffuse subliminal or near-subliminal auditory blends or overlays are imparted onto the audio output of recorded speech or stories (such as found on "books on tape", for example). In either case (recorded music or recorded speech), the pattern of the diffuse auditory stimulus, as in the case of the visual embodiments of the invention, may be keyed to the emotional content of the recordings. The sequences for conditioning a subject, and then eliciting the conditioned response therefrom, would proceed in a manner similar to those described for the visually-based exemplary embodiments.

In practice, the diffuse stimuli (i.e., impositions and overlays) in any sensory realm need not necessarily be added to a sensory medium after its release by presentation hardware. Diffuse sensory stimuli may be insinuated into a sensory medium at the time of recording, during production, during post-production, or during replication for sale.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

What is claimed is:

1. A method comprising:
   repeatedly presenting to a subject a training stimulus, the training stimulus eliciting from the subject a selected physiological, psychological, emotional, or mechanical response;
   presenting to the subject a diffuse, non-imaged visual stimulus along with each presentation of the training stimulus; and
   after repeatedly presenting the training stimulus, presenting the diffuse, non-imaged visual stimulus to the subject without the training stimulus so as to elicit from the subject the selected response,
   wherein:
   the diffuse, non-imaged visual stimulus is presented via a visual display and comprises a selected spatial pattern or arrangement of deviation of a selected parameter of the visual display from a reference level of that selected parameter; and
   the diffuse, non-imaged visual stimulus is arranged so as to be perceived by the subject only at a subliminal or near-subliminal level.

2. The method of claim 1 wherein the selected parameter is brightness, lightness, hue, chroma, saturation, polarization, image focus or blur, or image noise level.

3. The method of claim 1 wherein the visual display comprises a viewing screen, a video display, a still-image display, a heads-up display, a head-mounted display, or eyewear.

4. The method of claim 1 wherein:
   the training stimulus comprises a first selected image, video sequence, graphic element, text, symbol, or scene presented via the visual display; and
   the diffuse, non-imaged visual stimulus is superimposed on the training stimulus.

5. The method of claim 4 further comprising presenting to the subject a second selected image, video sequence, graphic element, text, symbol, or scene along with the diffuse, non-imaged visual stimulus superimposed thereon, without the training stimulus, so as to elicit from the subject the selected response in association with the second selected image, video sequence, graphic element, text, symbol, or scene.

6. The method of claim 4 wherein:
   the visual display comprises a video display;
   the training stimulus comprises at least one selected segment of video programming content presented via the video display; and
   the diffuse, non-imaged visual stimulus is superimposed on the selected video programming content segment.

7. The method of claim 4 further comprising transmitting to the visual display one or more electronic signals to cause display of the superimposed diffuse, non-imaged visual stimulus and the training stimulus.

8. The method of claim 7 further comprising:
   generating a first one of the electronic signals, which first electronic signal is representative of the diffuse, non-imaged visual stimulus; and
   generating a second one of the electronic signals, which second electronic signal is representative of the training stimulus.

9. The method of claim 7 further comprising generating at least one of the electronic signals from data on a storage medium.

10. A method comprising presenting to a subject a diffuse, non-imaged visual stimulus to elicit a selected conditioned physiological, psychological, emotional, or mechanical response, wherein:
    the selected conditioned response is a response previously elicited from the subject by a training stimulus;
    the subject is selected as having been previously exposed to repeated presentation of the training stimulus with concurrent presentation of the diffuse, non-imaged visual stimulus;
    the diffuse, non-imaged visual stimulus is presented via a visual display and comprises a selected spatial pattern or arrangement of deviation of a selected parameter of the visual display from a reference level of that selected parameter; and
    the diffuse, non-imaged visual stimulus is arranged so as to be perceived by the subject only at a subliminal or near-subliminal level.

11. The method of claim 10 wherein the selected parameter is brightness, lightness, hue, chroma, saturation, polarization, image focus or blur, or image noise level.

12. The method of claim 10 wherein the visual display comprises a viewing screen, a video display, a still-image display, a heads-up display, a head-mounted display, or eyewear.

13. The method of claim 10 further comprising presenting to the subject a selected visual stimulus along with the diffuse, non-imaged visual stimulus superimposed thereon, without the training stimulus, so as to elicit from the subject the selected response in association with the selected visual stimulus.

14. The method of claim 13 wherein:
    the selected visual stimulus comprises a first selected image, video sequence, graphic element, text, symbol, or scene presented via the visual display; and
    the diffuse, non-imaged visual stimulus is superimposed on the selected visual stimulus.

15. The method of claim 13 wherein:
    the visual display comprises a video display;
    the selected visual stimulus comprises at least one selected segment of video programming content presented via the video display; and
    the diffuse, non-imaged visual stimulus is superimposed on the selected video programming content segment.

16. The method of claim 13 further comprising transmitting to the video display one or more electronic signals to display the superimposed diffuse, non-imaged visual stimulus and the selected visual stimulus.

17. The method of claim 16 further comprising:
generating a first one of the electronic signals, which first electronic signal is representative of the diffuse, non-imaged visual stimulus; and
generating a second one of the electronic signals, which second electronic signal is representative of the selected visual stimulus.

18. The method of claim 16 further comprising generating at least one of the electronic signals from data on a storage medium.

19. A system comprising:
a visual display; and
an electronic processor operatively coupled to the visual display and structured and connected to transmit to the visual display one or more electronic signals to cause presentation via the visual display to a subject of (i) a diffuse, non-imaged visual stimulus and (ii) a selected visual stimulus or a training stimulus,
wherein:
the diffuse, non-imaged visual stimulus comprises a selected spatial pattern or arrangement of deviation of a selected parameter of the visual display from a reference level of that selected parameter; and
the diffuse, non-imaged visual stimulus is arranged so as to be perceived by the subject only at a subliminal or near-subliminal level.

20. The system of claim 19 wherein the selected parameter is brightness, lightness, hue, chroma, saturation, polarization, image focus or blur, or image noise level.

21. The system of claim 19 wherein the visual display comprises a viewing screen, a video display, a still-image display, a heads-up display, a head-mounted display, or eyewear.

22. The system of claim 19 wherein:
the selected visual stimulus or the training stimulus comprises a selected image, video sequence, graphic element, text, symbol, or scene; and
the visual display and the processor are structured and connected to superimpose the diffuse, non-imaged visual stimulus on the selected visual stimulus or on the training stimulus.

23. The system of claim 22 wherein:
the visual display comprises a video display;
the selected visual stimulus or the training stimulus comprises at least one selected segment of video programming content presented via the video display; and
the diffuse, non-imaged visual stimulus is superimposed on the selected video programming content segment.

24. The system of claim 22 wherein the electronic processor is structured and connected to generate:
a first one of the electronic signals, which first electronic signal is representative of the diffuse, non-imaged visual stimulus; and
a second one of the electronic signals, which second electronic signal is representative of the training stimulus.

25. The system of claim 22 further comprising a data reader for acquiring from a medium data to generate at least one of the electronic signals.

* * * * *